United States Patent [19]

Battarel

[11] 3,889,246

[45] June 10, 1975

[54] PROPAGATION REGISTER FOR MAGNETIC DOMAINS

[75] Inventor: Claude Battarel, Magagnosc, France

[73] Assignee: Techniques et Systemes Informatiques, Courbevoie, France

[22] Filed: June 22, 1973

[21] Appl. No.: 372,866

[30] Foreign Application Priority Data

June 6, 1972 France .............................. 72.22962

[52] U.S. Cl. ................ 340/174 ZB; 340/174 FB; 340/174 SR; 340/174 TF

[51] Int. Cl. ....................... G11c 19/00; G11c 11/14

[58] Field of Search ... 340/174 TF, 174 FB, 174 ZB

[56] References Cited

UNITED STATES PATENTS 3,713,116 1/1973 Bonyhard et al............. 340/174 TF 3,786,449 1/1974 Jauvtis .......................... 340/174 TF

*Primary Examiner*—James W. Moffitt

*Attorney, Agent, or Firm*—Sughrue, Rothwell, Mion, Zinn & Macpeak

[57] ABSTRACT

Propagation register for magnetic domains in a thin ferromagnetic polycrystalline layer having uniaxial anisotropy, deposited on an insulating substrate, comprising a new geometrical configuration of the flat electric conductors, deposited on the same substrate, which are used for ensuring the propagation of magnetic domains, in a shift register operation, between an input division (write-in by nucleation) and an output division (reading).

10 Claims, 11 Drawing Figures

PROPAGATION REGISTER FOR MAGNETIC DOMAINS

The invention comes within the branch of propagation memories for domains in thin polycrystalline ferromagnetic layers, having uniaxial anisotropy, deposited on an insulating substrate.

It concerns a new geometrical configuration of flat electric conductors deposited on the same substrate, which are used for ensuring the propagation of the magnetic domains, in a shift register operation, between an input division (write-in by nucleation) and an output division (reading). The invention may be applied to the producing of memories having a high data density for date processing equipment.

In a propagation register for magnetic domains in a polycrystalline ferromagnetic layer having uniaxial anisotropy, the propagation is effected in a "soft" magnetic zone having low coercivity, suitable shape, two rows of lateral teeth, surrounded by a magentic zone having higher coercivity, and being controlled by a clock.

A geometrical configuration of conductors used for the propagation of magnetic domains in such on thin magnetic layer are known, as described in U.S. Pat. No. 3,739,358 assigned to the common assignee, as follows.

1 An conductor called the propagation conductor, which covers the whole of the soft zone. It conveys a current having a uniform direction throughout its extent. That current which sets up the propagation field according to the easy magnetization axis, changes polarity alternated at each clock phase.

2. A conductor called an inhibition conductor, being U-shaped Y-shaped, which conveys one clock phase in two, changing polarity at each new pass of the inhibition current. The branch of a U covers the upper row of teeth; the adjacent branch covers the lower row. The fonction of the inhibition current is to resist a complete erasing of the domain, which would be caused by the clock phase concerned by the propagation current acting alone and the preserve useful part of the domain in the required place in the soft zone.

A branch line of the inhibition conductor covers either a single row of teeth or, in a folded back register, a lower row of a segment and an upper row of a segment of a neighbouring branch line.

The disadvantage of the known structure is that the propagation conductor has a relatively great width, this requiring, therein, to obtain the necessary current density, a high current intensity which may exceed 1 ampere. A high power consumption corresponds thereto. Moreover, it is known that it is uneasy to switch currents of this power with the required speed in the intended applications.

Moreover, in the known structure, the two currents change polarity alternately.

The invention overcomes these disadvantages by the use of two meander or sinous shaped conductors, each covering only a part of the configuration of the register, one of which, called the lateral conductor, is arranged like the inhibition conductor of the known structure, covering either a row of teeth or two rows face to face and the other, narrower, called the central conductor, covers, by one of its turns, the central part of a segment.

The lateral conductor is used simultaneously for the propagation of the domains on the fingers of a row in a register and for the erasing on the fingers of the row facing the first row. The central conductor which covers the space comprised between an outgoing circuit and a return circuit of the lateral conductor enables the passing of the domains from a finger on the lower row to the adjacent finger on the upper row or viceversa, receiving a current having a constant polarity corresponding to the propagation of the domains in the central zone of the rows of registers.

As in the known structure, the register is provided with a write-in conductor and a reading conductor.

It will be shown that, in a register thus equipped, the current which passes in the central conductor is a single pole current.

A variant of the basic structure will also be described in which the write-in conductor is dispensed with: in that case, there exists on the central conductor, currents of both polarities. If the unipolarity of one the two currents is, in that case, lost, the advantage of the slighter width of the lateral conductor, with respect to the known structure, will still be retained, and the advantage of dispensing with the write-in conductor will be added.

The invention will be described in detail with reference to the accompanying drawings among which:

Figure 1:
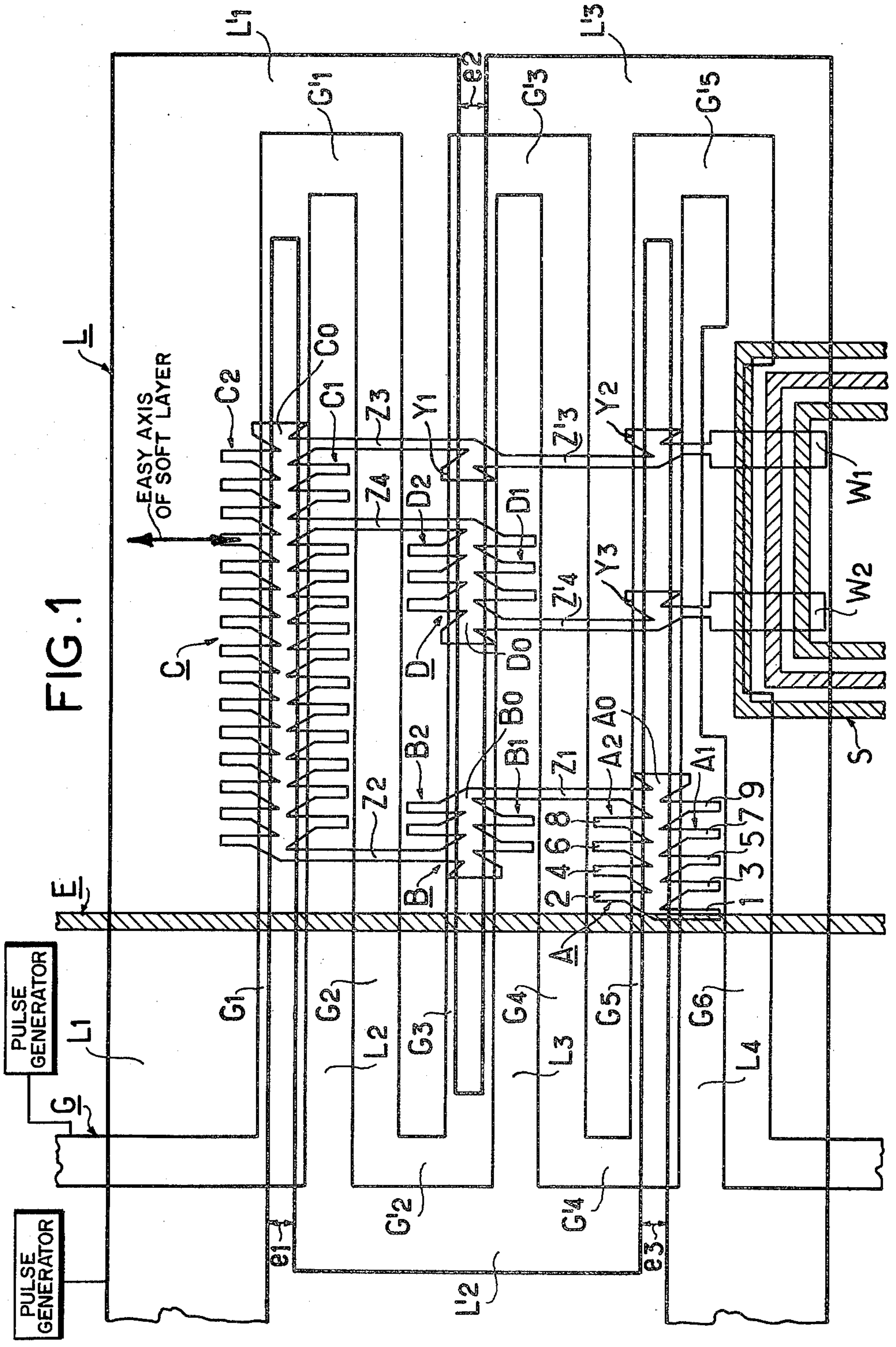
FIG. 1, is a diagrammatic plan view of a folded back register having conductors according to the geometrical configuration of the invention.
Figure 4:
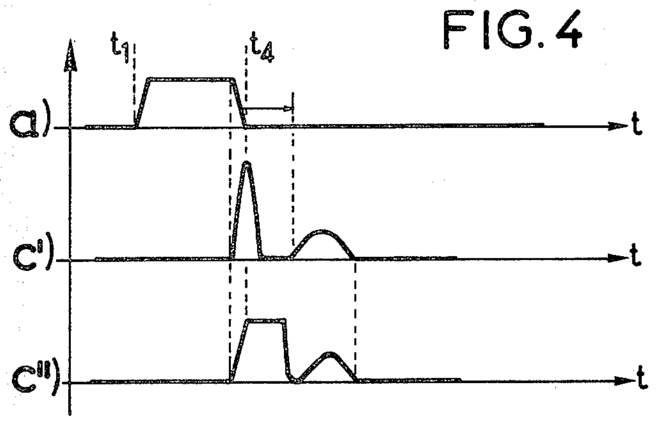
Figure 5:
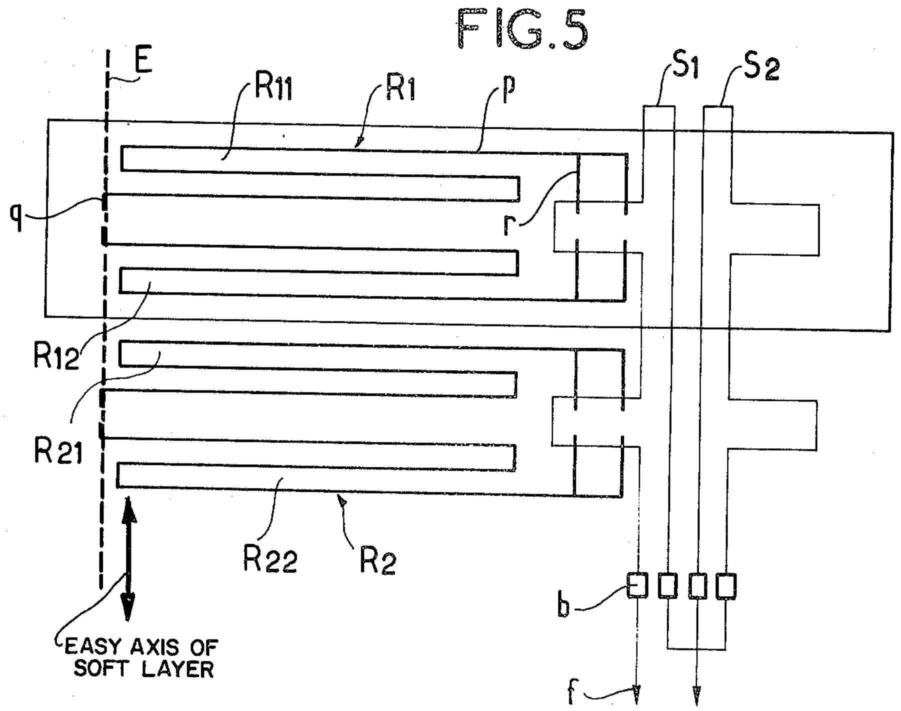
Figure 6:
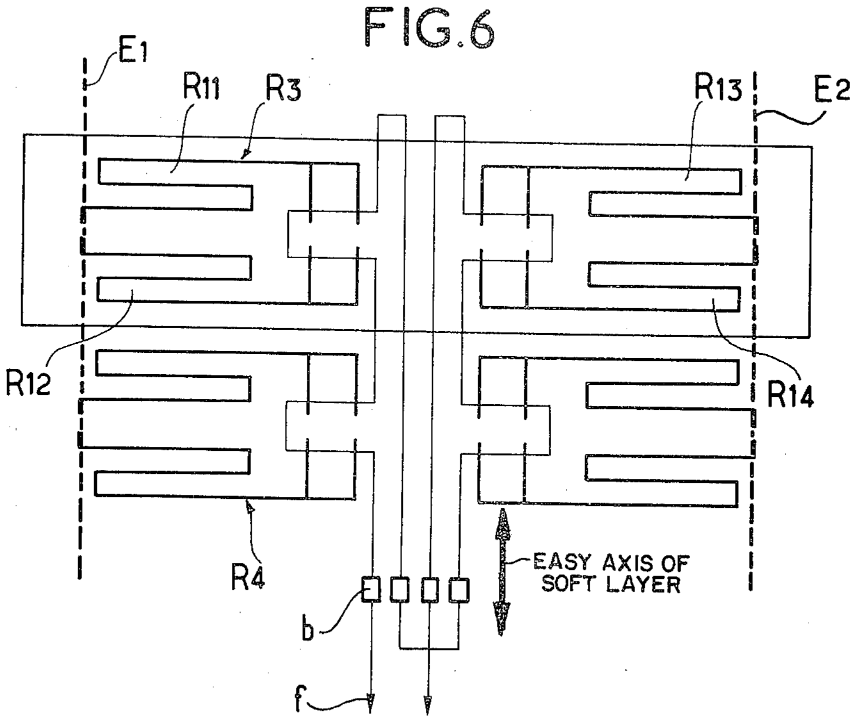
Figure 7:
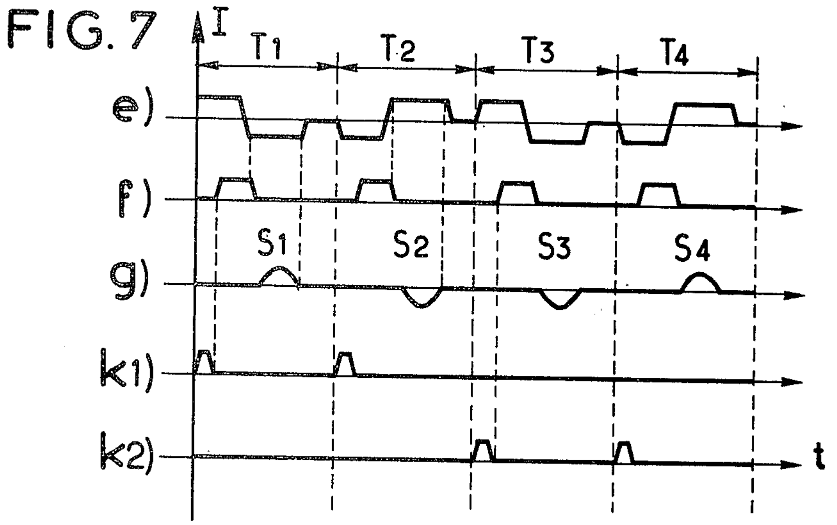
Figure 8A:
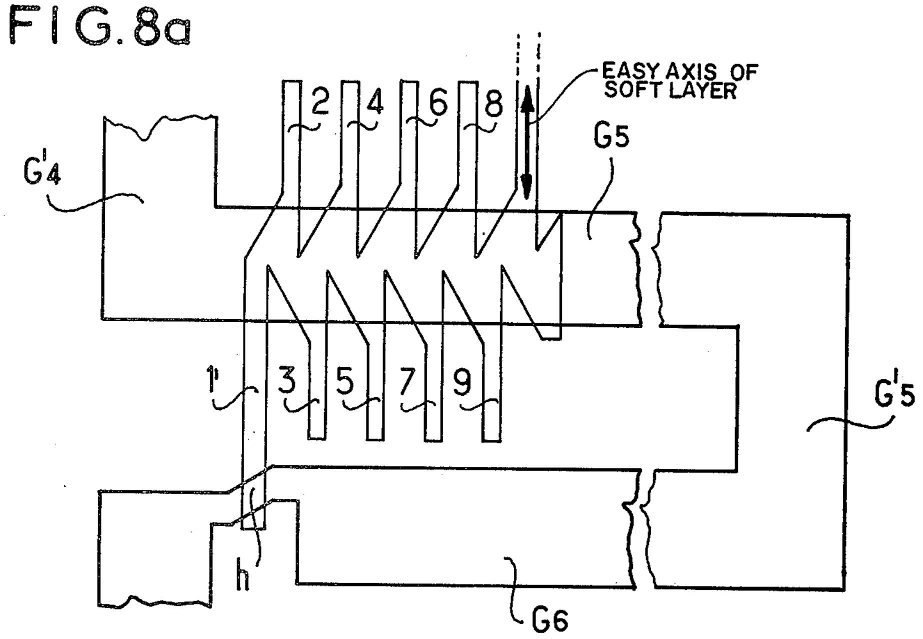
Figure 8B:
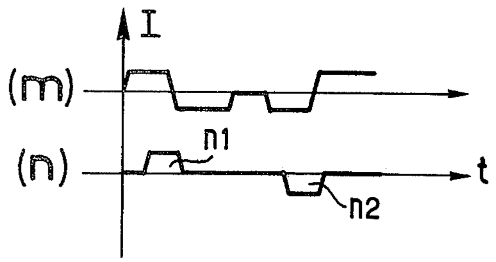
Figure 9:
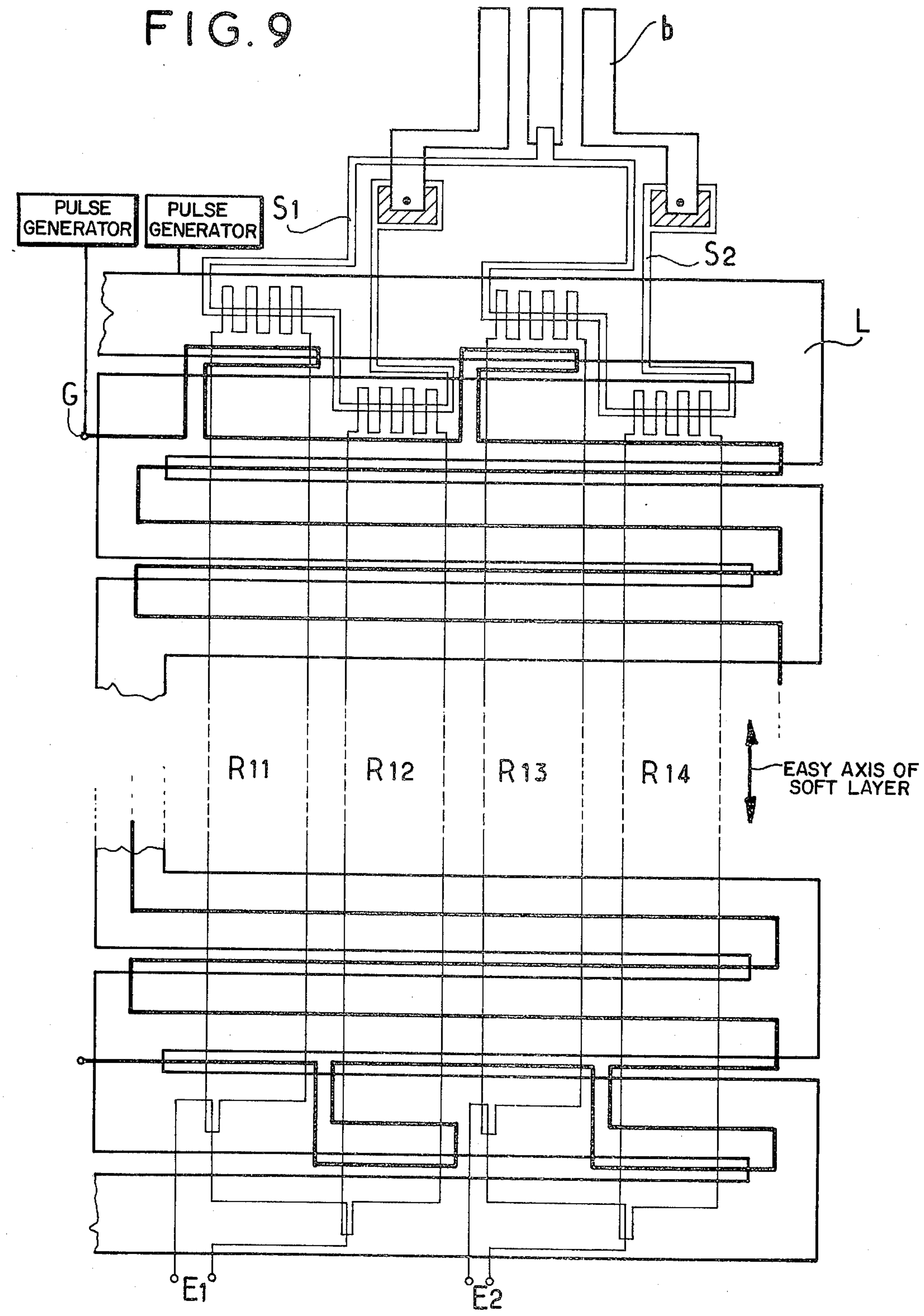

FIG. 4 contains graphs concerning interference signals;

FIG. 5 relates to a double register circuit with a reading compensation coil for reducing the effect of certain interference noises of internal origin;

FIG. 6 relates to another version with a quadruple register;

FIG. 7 is a diagramm of the phases corresponding to a quadruple register according to claim 6;

FIG. 8A shows a variant of a portion of the diagramm according to FIG. 1 enabling a write-in process without a write-in conductor;

FIG. 8b is a diagram of the corresponding phases, with a two-pole current in the central conductor;

FIG. 9 is a diagramm of a similar arrangement to FIG. 6, which enables a distribution of the four conductors on two levels in a quadruple register, contrary to the arrangement according to FIG. 6, which requires three levels.

Figure 10:
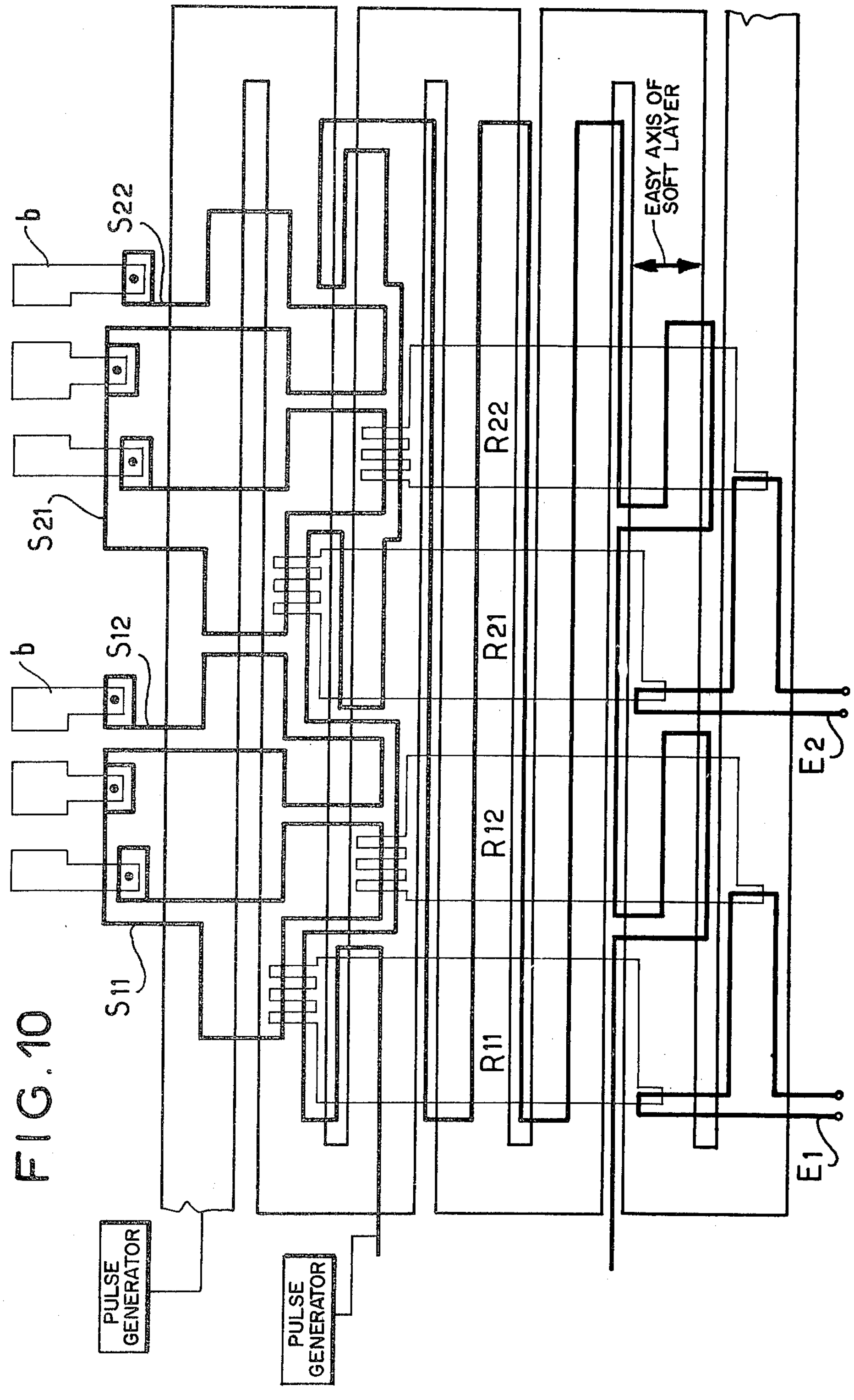

FIG. 10 is a diagramm of a similar arrangement to FIG. 9 of the constituting of two double registers having two levels of conductors.

DESCRIPTION OF THE PREFERRED EMBODIMENTS

FIG. 1 —FIG. 1 is an enlarged diagrammatic view of a folded back register for the propagation of magnetic domains. Each segment of the soft zone comprises a central part, a row of lower teeth and a row of upper teeth. These teeth have a shape and dimensions which have been described in detail in the above-mentioned patent application and which will not be described again here. An upper (or lower) tooth and the nearest lower (or upper) tooth constitute an advance component.

In the particular example illustrated in FIG. 1, the register comprises a first segment A, having a central part A0, a row of five lower teeth A1 numbered 1, 3, 5, 7, 9 and a row of four upper teeth A2, numbered 2, 4, 6, 8.

The segment A begins on the left with a nucleation division 1, a first lower tooth and is continued by four advance components.

By a first path Z1, turned in the vertical direction, the right-hand part of the segment is connected to the right-hand part of a segment B (B0, B1, B2) comprising two advance components, parallel to the segment A and placed above in the vertical axis of the drawing.

The left-hand part of the segment B is connected by a second vertical path Z2 to the left end of an upper segment C in three parts, C0, C1, C2, having 14 advance components. The right-hand end of the segment C is connected to a first reading division W1 placed a little below the segment A, by a third vertical path Z3, followed by a fourth vertical path Z'3. The path Z3 is connected to the path Z'3 by an intermediate division having the shape of a section of an advance component, Y1, aligned with the segment B and the path Z'3 is connected to the reading division W1 by a second intermediate division Y2 having the same shape as Y1, aligned with the segment A.

From the third advance component from the right of the segment C, there is downward vertical path Z4, leading to a segment D having elements D0, D1, D2, aligned with the segment B, containing three advance components going from right to left. The left hand end of the segment D is connected, by a vertical path Z–4, through an intermediate division Y3 aligned with Y2, to a second reading division W2 aligned with W1.

That arrangement is provided for doubling the reading energy by doubling the number of reading divisions.

The intermediate division Y1, Y2, Y3 have the function of avoiding an accidental rise of the domains in their transit from top to bottom.

A lateral conductor L which is of serpentine or sinous shape has a first turn L1 covering the upper row of teeth, C2, of the segment C; a second turn L2 covering the lower row C1 of teeth of the bottom of the segment C, the upper rows B2 and D2 of the teeth of the segments B and D, as well as the paths Z2, Z4 and Z3; a third turn L3 covering the rows B1 and D1, as well as the paths Z1, Z'4 and Z'3; a fourth turn L4 covering A1 and the reading divisions W1 and W2. These turns are connected by cross-pieces L'1, L'2, L'3.

the intermediate spaces e1 between L1 and L2, 82 between L2 and L3, e3 between L3 and L4, have just the required width for leaving the central part of each segment uncovered. A sinous conductor G, called the central conductor, having a slightly greater width than e1, e2, e3, for example 20 to 40 percent wider, has a first turn G1 covering the central part C0 of the line C; a second turn, G2 intersecting the paths Z2, Z4, Z3; a third branch G3 covering the central parts B0, D0 of the segments B and D and the intermediate division Y1, a fourth turn G4 intersecting the paths Z1, Z'4, Z'3; a fifth turn G5 covering the central part A0 and the intermediate divisions Y3, Y2; a sixth branch G6 covering the reading divisions W1 and W2. These turns are connected by and cross-pieces G'1, G'2, G'3, G'4, G'5.

The return circuits of the conductor G, which are even turns, pass between the lines of registers, hence in an unused zone.

There exists, even, a write-in conductor E pointed in the vertical direction, covering at least partly the nucleation division 1; and a reading conductor S forming several coils, preferably, above the reading divisions W1, W2.

Figure 2:
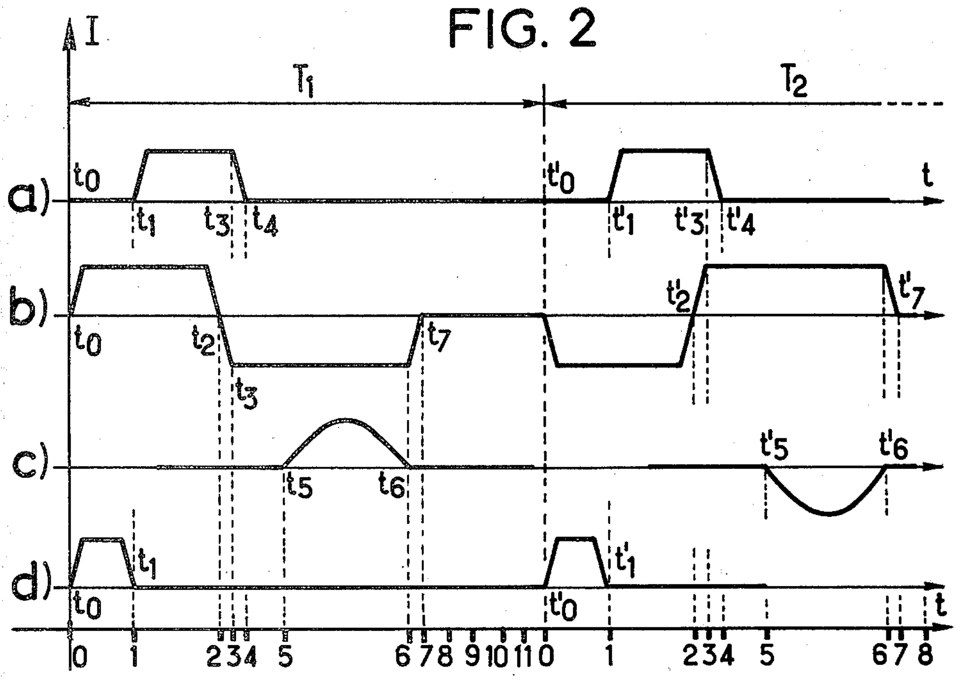
FIG. 2 is a complete diagram of the phases showing the currents in the various conductors during a complete cycle.

FIG. 2—FIG. 2 shows four graphs, (a), (b), (c), (d), corresponding respectively to the currents in the central conductor G, in the lateral conductor L, in the reading conductor S, in the write-in conductor E, during two half-cycles T1, T2 forming a complete advance cycle.

The current pulses have a trapezoidal shape.

The first half-cycle T1 begins at to and ends at t'0, the beginning of the second half-cycle T2. It comprises the intermediate phases *t*1–*t*7.

From *t*0 to *t*1, it is assumed that there is a pulse in the write-in conductor E; and even another of same polarity between *t'*0 and *t'*1.

The central conductor G receives a pulse which is positive, for example, from *t*1 to T4, then another of same polarity from *t'*1 to *t'*4. The stage ends at *t*3 (*t'*3).

The lateral conductor (L) receives a first positive pulse, followed by a second negative pulse having a longer duration. The pass through zero between the positive stage and the negative stage takes place at *t*2. The negative pulse which begins at *t*2 returns to zero at *t*7.

The current passes in the reading conductor S from *t*5 to *t*6. Between *t*7 and *t'*0, no conductor has any current passing through it.

In the following half-cycle T the graduating of the currents is the same; the difference is that the polarity of the two successive pulses in the lateral conductor L are reversed; similarly, the polarity of the reading current is reversed.

OPERATION— The pulse of the write-in current during the time *t*0–*t*1 causes a combination of magnetic fields which, added to the field set up by the simultaneous flow of the positive current in the lateral conductor, enables a write-in domain to be generated in the write-in tooth 1 reversing locally the direction of the magnetisation (the direction of the write-in current is optional in the reversing process). The direction of the current in the lateral conductor is such that it tends to reverse the magnetization in the soft magnetic layer, pointed originally as a whole in the same direction as the hard layer.

Then, the lateral current $I_{L+}$ being maintained, a current is sent in the central conductor from the phase $t_1$. The result there of is an elongation of the write-in domain below the central conductor.

The same growth would occur for a domain during propagation which is situated, for example, in the tooth 5 (FIG. 1); in that case, as for the tooth 1, the domain extends towards the right under the central conductor, under the effect of the directivity of propagation in the oblique-barrier structures described in the referenced patent.

At the phase *t*2, the lateral current is reversed; the central current being still applied. As there is a covering of the edges of the central conductor and of the lateral conductor, there is a space continuity of the applied field and the domain is alongated in the upper tooth, that is, at 6 and not at 4 for the domain originally at 5 and at 2 for the domain originally at 1.

Simultaneously, the magnetic field being reversed, under the turn L4 of the lateral conductor, the bottom part of the domains originally at 1 and 5 is erased.

At the phase *t*4, the central current falls back to zero, although the lateral current is preserved until *t*7; the lower part of the domains originally at 1 and 3 and now at 2 and 6, still subsists for a while up to the centre line of the segment A.

At the phase *t*7, the disappearance of all current enables the local magnetic fields caused by a discontinuity in the thickness of the magnetic layer at the place where the edges of the structure are inclined, to erase automatically the parts of domains placed under the central conductor. Finally, the domains originally at 1 and 5 are found exclusively at 2 and 6, free from all interference residue. The domains have indeed advanced by a half step.

At the following clock half cycle, it could be demonstrated, on following the same analysis, that the same propagation of the domains takes place from bottom to top, in order to complete, thus, a complete advance step.

The passing from segment to segment is effected in a similar way, the return circuits of the central conductor (even turns) in which an erasing current flows during the intervals *t*1–*t*4 and *t*'1–*t*'4, do not hinder operation. The propagation of the domain is simply deferred until *t*4 for the downstream half of the passes going downward to the reading divisions.

Advantage is taken of that property for reading: on referring to FIG. 1, it will be seen that the domain placed at Y2, which should propagated from the phase *t*3 will be defferred until *t*4, this enabling the domain to propagate under the reading conductor S during the interval *t*5–*t*6, well separated from the transit current phases.

Figure 3:
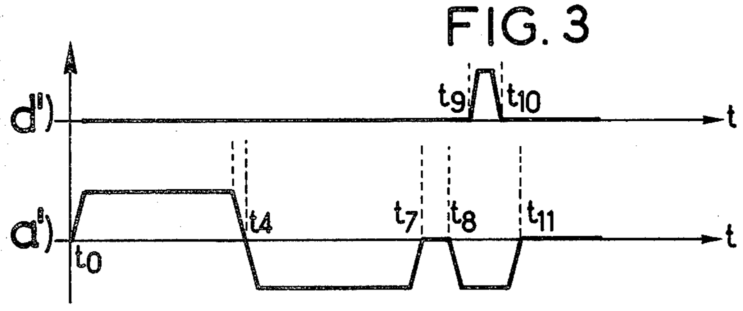
FIG. 3 is a diagramm of the phases corresponding to another position of the write-in process in a cycle.

FIG. 3 — FIG. 3 relates to the operation of the device according to the invention according to the process called downstream (end-of-cycle) write-in process, contrary to the case of the diagram in FIG. 2, which corresponds to the process called upstream (beginning-of-cycle) write-in process. In that case, the graph (*d'*) shows that the write-in pulse is not supplied at the beginning of the half-cycle but in the end part, between *t*9 and *t*10. A pulse having the same polarity as the long pulse, between *t*8 and *t*11, graph (*a'*) must then be added to the lateral current.

FIG. 4 –FIG. 4 contains three graphs: graph (*a*) taken from FIG. 2, graph (*c'*) showing the signal which would be obtained at the input of a reading amplifier without precaution, graph; (*c''*) showing the signal at the ouput of the same amplifier in the same conditions.

There is a strong interference signal due to the falling of the current in the central conductor, coupled by mutual induction between the central conductor and the reading coil.

As the reading signal is weak in relation to that interference signal, it is essential to insert a reading compensation coil identical to the first (see the conductor S, FIG. 1), but connected in series opposition to obtain a low-energy interference signal at the input of the reading amplifier. Indeed, if that interference were too intense, the result thereof would be a saturation of the reading amplifier, whence the prolonging of the duration of that interference noise at the output of the reading amplifier, a circumstance which would result in a poor discrimination between the interference signal and the actual reading signal.

FIG. 5 — FIG. 5 shows such an arrangement of the reading coils, applied to a double register.

What is called a double register is the combination of two registers such as the registers in FIG. 1, having their control conductors in common.

FIG. 5 shows that arrangement in a symbolical form. Only the axis of the segments of folded back registers such as P has been shown, in the form of a line, with, at the left-hand end, in the form of a short hook such as *q*, a write-in division and, at the right-hand end, in the form of two long hooks, such as *r*, the two reading divisions (see FIG. 1). Connection terminals such as *b* have conductors such as *f* near the reading amplifier.

Two unit registers R11, R12, are combined in a double register R1 and two unit registers R21, R22 are combined in a double register R2.

A write-in conductor E covers all the write-in divisions. The reading conductor comprises an active circuit S1 and an inactive circuit S2 connected in opposed series used for compensating the interference noises.

For each double register, the lateral conductor completes an outgoing circuit and a return circuit to the write-in and reading stations of the top register R11 and the write-in and reading stations of the bottom register R12, so that at each successive clock phase, the opposite polarities of the lateral current enable reading and write-in alternately on the top register and on the bottom register.

In that configuration, the whole density of the structure is usable and each adjacent tooth of the structure may bear a data item "0" or "1", or possibly two "1"s in succession.

The amplitude of the interference signal on the fall back of the central current will be minimized twice; a first time since as the conductor (not shown) comes back along the transversal axis of symmatry of the reading coil, the flux coupled between that central conductor and the reading coil will be made of theoretically nil by induction of two fluxes of opposite polarity and, in practive, very low.

Moreaver, the series-opposition connection of the reading-coils will give to the cancelling of the second order of that residual interference.

A double register is selected by sending it excitation currents. On the other hand, a double register which does not receive any excitation current is not selected. The write-in conductor E is common to the write-in stations of the double register and the write-in be effected without ambiguity, since the propagation and hence a signal which is favourable to write-in on a write-in station, and an opposite signal favouring the erasing on the connected write-in station of the other half of the double register, corresponds to a clock phase.

Therefore, write-in will be effected alternatively on one register then on the other at the consecutive clock phases and the write-in effected in coincidence between the write-in conductor current and the lateral current may be effected only in the double register selected, for example in R1 and not in R2. In particular, the write-in will not be effected in a non-selected register which does not have any lateral current although the write-in conductor is common to the various double registers.

The various double registers which constitute a set of selected data channels receive excitation currents only one at a time, that is, when a double register is to be selected, a lateral current and a central current are sent during a certain number of clock phases corresponding to the number of bits required in that register, but during that time, no current even partial, is sent in the other registers, this completely avoiding undesirable phenomena in thin magnetic layers, such as creeping (growth and decrease of the domains, which may empty the domain register). There will therefore be a reading and a write-in at each elementary clock phase, this corresponding to the maximum using frequency of such a register. It will be observed that the useful reading signal caused by the passing from a domain under the reading conductor is not affected by the presence of the compensation band, contrary to the case of interference noise which, caused by a coupling between the central conductor and the active reading conductor is reduced to zero by a coupling in the reverse direction with the compensation conductor.

FIG. 6 —Nevertheless in certain cases, it will be possible to increase the tolerances on the various operation parameters by reducing the interactions between the points of the magnetic domains. This result will be obtained if the date bearing domains are systematically drawn apart from one another. For that purpose, a buffer "0" will be inserted each time between two data bits.

Operation is identical to the preceding case, but the density of the number of useful bits per square centimeter is divided by two and the using frequency is divided by two.

A different organization, illustrated in FIG. 6, makes it possible to use that systematic spacing of the data bits *n* while operating at the maximum frequency, that is, while writing in and while reading at each elementary clock phase.

FIG. 6 shows, at the top, a quadruple register R3 formed by a combination of four registers having common control conductors: two registers on the left-hand side, R11 and R12, forming a first double register and two registers on the right-hand side R13 and R14, forming a second double register.

A second quadruple register R4 constituted in an identical way may be seen in the bottom part.

There are two write-in conductors, the one E1 on the left-hand side, the other E2 on the right-hand side. Here, the compensation reading circuit is used as a normal reading circuit, that is, the two reading circuits connected up in series-opposition are connected with the four elementary registers of the quadruple register, so that the reading is effected on one side on a double register, for example R11–R12, when the compensation is effected on the other side, R13–R14 and vice-versa.

A single central conductor and a single lateral conductor cover the four registers combined with a quadruple register: an outgoing circuit and a return circuit of the lateral conductor covers the write-in and reading divisions of the two top registers (R11, R13) in the outgoing path and those of the two bottom registers (R12, R14) in the return path.

FIG. 7. FIG. 7 contains five graphs explaining the operation of a quadruple register according to FIG. 6.

During four half-cycles T1, . . . T4, the graph (*e*) shows the current in the lateral conductor the graph (*f*)

shows the current in the central conductor, the graph (*g*) shows the current in the reading amplifier, the graph (*k*1) shows the current in the write-in conductor E1 and the graph (*k*2) shows the current in the write-in conductor E2.

For example, in a first clock phase T1, the write-in and the reading take place in the top left-hand register, but no write-in current is sent in the right-hand write-in conductor, which would enable the write-in in the top right-hand register.

During that phase T1, no write-in can be effected in the two bottom registers since the lateral current sets up a field in the earsing direction for the write-in and reading stations of these two bottom registers.

In a second clock phase, the polarity of the lateral current is reversed and write-in and reading are effected in the bottom left-hand register. Similarly, during T2, no write-in current is sent to the right-hand write-in conductor and there is neither write-in nor reading in the bottom right-hand register. At the following clock phases T3 and T4, in the same way, write-in and reading will be effected successively in the top right-hand and bottom right-hand registers without reading or write-in in the left-hand registers.

It will be seen that in this way, a signal will be detected in the reading coil exclusively for one register among the four registers of the quadruple register at each clock phase T.

It will be seen, in this operation, that for one of the four combined registers given, there will be a possible write-in phase (in the case of a logic 1) every four clock phases, that is, each time an advance of two steps has been made in the magnetic structure.

It follows that there will always be an unused step between two data bearing domains.

The selection of the registers will be effected in a similar way to that which has been set forth for the ease of the double registers, that is, a quadruple register will be selected when it receives the control current in its central conductor and its lateral conductor whereas no current will flow in the central and lateral conductors of the other quadruple registers.

Another advantage of the quadruple register structure illustrated in FIG. 6 resides in a greater symmetry of the conductors and more particularly the circuiting of the central and lateral conductors is set apart and at an equal distance from the two reading coils, thus enabling a better cancelling of inductive interference and, consequently, a better signal-to-noise ratio.

FIG. 8*a*-FIG. 8*a* shows a variant of the device according to FIG. 1, in which it is possible with the write-in conductor.

It shows a portion of the segment A in FIG. 1 with the turn G6 of the central conductor covering the bottom part of the end division 1′, slightly elongated in relation to the division 1 in FIG. 1.

The central conductor passes above the bottom part of the division 1. In that region *h*, a narrow width is imparted to the central conductor, to increase the current density locally, as well as providing an inclined direction thereto to make the reversing of the magnetization easier.

FIG. 8*b* — FIG. 8*b* comprises two graphs (*m*), current in the lateral conductor and (*n*), current in the central conductor.

The central conductor receives a pulse having a polarity $n1$ for propagation and a pulse of opposite polarity $n2$ for write-in.

That arrangement requires operation as a double register, with simple spacing between the domains.

FIG. 9 — FIG. 9 shows diagrammatically the constitution of a quadruple register having two levels of conductors.

Four single registers R11, R12, R13, R14, fitted with a common lateral conductor L, a common central conductor G, two write-in conductors E1, E2, two opposed series connected reading circuits S1, S2 are shown.

By staggering the height of the even registers R12, R14, in relation to the odd registers R11, R13, it is possible to constitute a geometrical configuration of conductors in which the write-in conductors and the reading conductors do not intersect the lateral conductor, nor the central conductor. This makes a structure having two levels possible, contrary to the case of FIG. 1, which requires three levels of conductors.

FIG. 10 — FIG. 10 illustrates the constituting of two double registers having two levels of conductors as in FIG. 9. Two pairs of single registers R11-R12 and R21-R22 fitted with a common central conductor and a common lateral conductor are shown. By staggering the height of the even registers R12, R14, in relation to the odd registers R11, R13, it is possible to constitute a geometrical configuration in which the write-in conductors and the reading conductors do not intersect the lateral conductor or the central conductor. The reading and compensation coils are arranged symmetrically in relation to the central line, this enabling good compensation of the inductive reading interference noises.

I claim:

1. In a propagation register device including at least one register for magnetic domains in a soft zone formed by a magnetic layer of low coercivity and uniaxial anisotropy perpendicularly to the propagation direction and surrounded by hard zones having a greater coercivity; the improvement comprising: for each register, a plurality of advance components in alignment with the propagation direction, each component having a central soft zone and a first and second lateral soft zone with inclined edges between the central and the lateral zones such that a domain which passes from the first lateral zone to the second is slightly deviated perpendicularly to the easy magnetic axis at an edge and that the domain when returning to the central zone is again deviated in the same direction and enters into the first lateral zone of an adjacent advance component, a first sinous lateral conductor, having at least two parallel turns, including a first turn covering a plurality of the said first lateral zones and a second turn covering the corresponding second lateral zones, and a second sinous central conductor having a first turn which covers approximatively the interspace between the two turns of the lateral conductor in which are located the central zones of the advance components.

2. The register device according to claim 1, wherein: the central conductor comprises a portion which is narrower and inclined above a nucleation division, and said arrangement further includes means for modifying pulses of both polarities passing in said central conductor.

3. The register device according to claim 1, wherein: for each register, said plurality of advance components comprise separate folded back register segments and wherein said lateral conductor and said central conductor includes turns thereof in operative position with respect to said separate folded back register segments.

4. The register device according to claim 1, further comprising means for passing electrical pulses of both polarities through the lateral conductor and pulses of a single polarity through the central conductor.

5. The register device according to claim 4, wherein the registers are two in number and the registers are combined as a double register having the two common conductors and the reading conductor forms two series-opposition connected circuits only one of which is used for collecting a reading signal, the other being used for the compensation of an interference signal.

6. The register device according to claim 5, wherein: a staggered configuration of the even and odd elementary bi planar registers are employed and wherein, a geometrical configuration of conductors avoids the passing of the write-in and reading conductors on the excitation conductors.

7. The register device according to claim 5, wherein: for each register, said plurality of advance components comprise separate folded back register segments and wherein said lateral conductor and said central conductor includes turns thereof in operative position with respect to said separate folded back register segments.

8. The register device according to claim 4, wherein the registers are four in number and the register are combined as a quadruple register having both excitation conductors common, two separate write-in conductors and two reading conductors connected up in series-opposition, each of which collects a reading signal.

9. The register device according to claim 8, wherein: a staggered configuration of the even and odd elementary bi planar registers are employed and wherein a geometrical configuration of conductors avoids the passing of the write-in and reading conductors on the excitation conductors.

10. The register device according to claim 8, wherein: for each register, said plurality of advance components comprise separate folded back register segments and wherein said lateral conductor and said central conductor includes turns thereof in operative position with respect to said separate folded back register segments.

* * * * *